Aug. 5, 1941.  L. T. OWEN  2,251,495
POLE LINE HARDWARE DEVICE
Filed June 15, 1940
FIG_1_
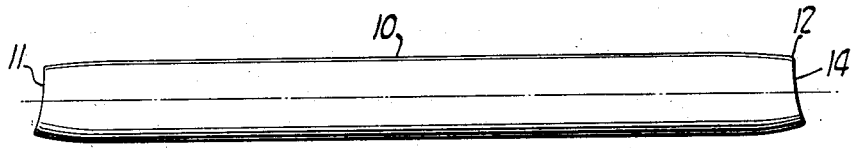
FIG_2_
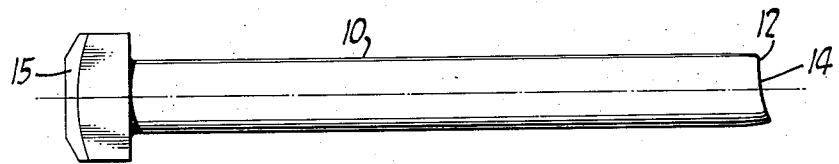
FIG_3_
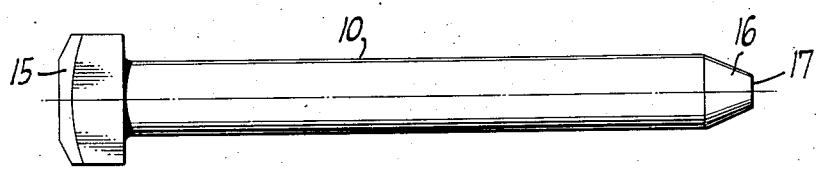
FIG_4_
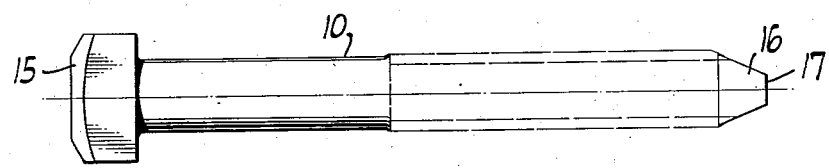
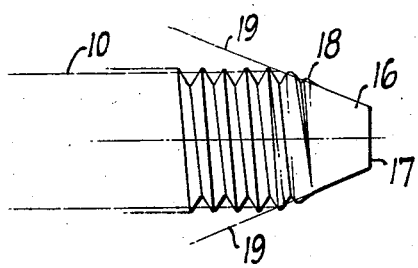
FIG_5_
INVENTOR
Langdon T. Owen
BY Robert H. Eckhoff
ATTORNEY Patented Aug. 5, 1941

2,251,495

UNITED STATES PATENT OFFICE 2,251,495

POLE LINE HARDWARE DEVICE

Langdon T. Owen, Redwood City, Calif., assignor to Hubbard and Company, a corporation of Pennsylvania Application June 15, 1940, Serial No. 340,743

2 Claims. (Cl. 85—1)

This invention relates to improvements in threaded bodies such as bolts and the like—and particularly to methods for manufacturing new and useful pole line hardware devices including cross arm bolts, double arming bolts, eye bolts, carriage bolts and the like.

In the construction and maintenance of electrical transmission and distribution systems, pole line hardware is employed. Such systems ordinarily include structures elevated on poles above the ground. While as much of the construction as possible is first assembled on the ground and then raised into position, a large portion if not the major portion of the construction and maintenance work has to be carried on at a considerable height above the ground. Those engaged in work on such elevated structures normally support and maintain themselves in position by means of leg irons and belts. Further, the men normally wear two pair of gloves because of the hazard of electrical shock; one pair is usually made of rubber and the other of heavy, protective leather. It will be appreciated that a man working at a considerable elevation above the ground, supporting himself on a pole by means of leg irons and a belt, unable to move about freely or with any ease, and working with his hands in two pair of gloves, is at some pains to handle bolts, nuts and tools. Cross arm bolts, double arming bolts, eye bolts, carriage bolts and the like are employed in the fabrication of electrical systems. If a lineman encounters any difficulty in starting a nut on any one of these, there is little he can do except to persist in his efforts. Heretofore it has not been at all unusual to encounter such difficulty because of the previous bolt or threaded structures employed and because of the method of manufacture employed. The threaded structures produced prior to the present invention have been such that battered thread ends, half or quarter threads, have been quite usual in the threaded structures employed heretofore.

In accordance with this invention I provide a threaded body structure for use on pole line hardware which facilitates and materially simplifies assembly of the threaded structure and the nut when the two are assembled in manufacturing. This ease of assembly is carried over into the field and is present in the threaded body structure even if the same be recovered by salvage. In this connection it is to be pointed out that it is desirable that as much as possible of the hardware employed in pole line construction be salvagable.

To recover pole line hardware from the pole line structures, it is frequently necessary to remove the bolt or other threaded structure by actually hammering on an end thereof. With prior art threaded structures considerable damage to the thread usually resulted whereby the structure was ruined for subsequent use. Threaded structures manufactured in accordance with the present invention resist successfully ordinary salvage operations and can usually be salvaged several times without damage.

One object of the present invention is to provide a new and improved threaded end construction for a pole line hardware device such as a bolt or the like.

Another object of the present invention is to provide an improved method of manufacture of threaded pole line hardware structures.

In addition to the foregoing the invention includes other objects and features of advantage, some of which, together with the foregoing, will appear hereinafter, wherein the methods of manufacture and the present preferred form of structure are disclosed.

In the drawing accompanying and forming a part hereof—

Figure 1 is a plan view of a blank rod structure.

Figure 2 illustrates a rod structure formed with a head.

Figure 3 represents a headed rod structure formed in accordance with the present invention.

Figure 4 is a typical showing of a threaded rod structure embodying certain features of the present invention.

Figure 5 is an enlarged fragmentary view of a portion of the threaded rod structure illustrating certain features of the present invention.

The threaded structures employed for pole line hardware have been manufactured heretofore by operations which included the shearing of a rod from a length of round mild steel, the forming of a suitable head or eye on one end of this rod and the threading of the rod either by cutting or rolling. In case of double arming bolts, of course, the head is omitted but the operation is otherwise the same. This manufacturing operation is typical of that employed for the large scale production of bolts and studs generally.

The body to be threaded is usually severed from a length of rod or wire by a shearing operation. This operation is such that usually one face of the severed rod is normally cut at an angle closely approximating a right angle to the longitudinal axis of the rod. In Figure 1 this end is indicated at 11 on rod 10. However, the other end, that indicated in Figure 1 at 12, is usually quite distorted and the end face 14 is at an angle other than a right angle to the longitudinal axis of the rod while the end of the rod is bent and out of round.

After being cut, each rod is normally provided with some form of head such as that indicated at 15. This can be formed thereon by any suitable means as by forging or by an operation performed in the cold with suitable dies. Thereafter the structure is threaded, either with a cut or a rolled thread. However, because face 14 is at an angle other than 90° to the longitudinal axis, a half or quarter thread is usually formed on the end of the rod. Such an end makes it necessary that any nut placed on the rod be lined up with considerable accuracy to ensure that the nut carries over the quarter or half thread and engages the continuous thread. In many instances this is difficult to attain, particularly when the bolt is in place on an elevated pole line structure. The difficulties encountered by linemen in attempting to start a nut while encumbered with two pair of gloves and while supported on leg irons and a belt may, it is submitted, be readily visualized even by one not skilled in the art.

In accordance with this invention instead of forming the thread on the rod, I subject the rod to an operation in which the end 12 is tapered as appears in Figure 3. This removes the metal containing the deformation at the rod end and, at the same time, enables certain other advantageous features to be secured.

The taper 16 provided on the end of the rod is generally of a length corresponding to about the pitch of four threads while the angle of the taper is preferably about 50°. The end of the tapered portion is preferably made blunt as at 17 although this is not necessary. By employing a taper angle of about 50° I am able to include in the tapered portion approximately one full thread. That is, the tapered end of the bolt includes nearly one full thread revolution on the pitch diameter of the thread, although the thread may not be of a height corresponding to the overall width of the bolt.

I prefer to provide the thread on the body by rolling because in this way a portion of the thread on the tapered end is actually rolled outwardly from the material on the tapered end during the thread rolling operation. This is shown diagrammatically in Figure 4 and actually in the enlarged view of Figure 5 wherein the first bolt thread is indicated at 18. This thread is rolled outwardly during the thread rolling operation. The dotted line indicated at 19 shows the normal outline of the tapered end. Its relation to the tapered end shows how the material has been forced out in the rolling operation from the tapered end into the thread. By making the tapered end at an angle of about 50° and by rolling or cutting the thread thereon, the placing of a nut on the threaded structure is facilitated and can even be done by machine.

A distinction is made out between cutting a thread on the bolt and then the taper—this is not satisfactory because partially formed, torn and broken threads result.

While I have shown a head 15 provided on the bolt this is not necessary and instead an eye or a carriage bolt end can be provided. In the case of double arming bolts, no head need be provided, both ends of the rod being tapered prior to threading of the rod.

The tapered end of the rod facilitates salvaging of the threaded structure inasmuch as I have found it possible to hammer on the end of the threaded structure with force usually sufficient to salvage it without damage to the thread. This enables the threaded structure to be removed and used again, something heretofore usually impossible, unless great care was exercised in the removal of the bolt or the bolt was rethreaded.

I claim:

1. A pole line hardware device comprising a threaded body having a terminal end thereon tapering toward the extremity thereof for a distance equivalent to the pitch of only about four of the threads on said body, said terminal end being tapered at an angle of about 50°, sufficient to include thereon only about one complete thread from said body having the same root diameter as the other threads on said body.

2. A pole line hardware device comprising a threaded body having a terminal end thereon tapering toward the extremity thereof for a distance equivalent to the pitch of only about four of the threads on said body, said terminal end being tapered at such an angle to the threaded body that said tapered terminal includes only about one complete thread from said body having the same root diameter as the other threads on said body.

LANGDON T. OWEN.